(12) United States Patent  
Parker

(10) Patent No.: US 9,511,601 B2  
(45) Date of Patent: Dec. 6, 2016

(54) METHODS AND APPARATUS FOR STORING AND RETRIEVING INFORMATION RELATING TO EDIBLE OBJECTS

(71) Applicant: TEN Media, LLC, Beverly Hills, CA (US)

(72) Inventor: Bradley E. Parker, Glen Ridge, NJ (US)

(73) Assignee: TEN Media, LLC, San Juan Capistrano, CA (US)

( * ) Notice: Subject to any disclaimer, the term of this patent is extended or adjusted under 35 U.S.C. 154(b) by 0 days.

(21) Appl. No.: 13/967,118

(22) Filed: Aug. 14, 2013

(65) Prior Publication Data

US 2014/0085397 A1  Mar. 27, 2014

Related U.S. Application Data

(60) Division of application No. 13/090,614, filed on Apr. 20, 2011, now Pat. No. 8,544,739, which is a
(Continued)

(51) Int. Cl.  
*G06F 17/30* (2006.01)  
*B41J 3/407* (2006.01)  
(Continued)

(52) U.S. Cl.  
CPC .............. *B41J 3/4073* (2013.01); *A01K 43/10* (2013.01); *B23K 26/063* (2013.01);  
(Continued)

(58) Field of Classification Search  
USPC ........ 235/385, 383; 705/26, 26.9; 455/556.1  
See application file for complete search history.

(56) References Cited

U.S. PATENT DOCUMENTS 1,906,094 A  4/1933  Powell  
3,094,920 A  6/1963  Priesmeyer  
(Continued)

FOREIGN PATENT DOCUMENTS

CA  2722417 A1  10/2009  
DE  3601913  7/1987  
(Continued)

OTHER PUBLICATIONS

[No Author Listed], American Association for the Advancement of Science. Planning Effective Bioterror Responses. Press release, Feb. 14, 2004.

(Continued)

*Primary Examiner* — Allyson Trail  
(74) *Attorney, Agent, or Firm* — Apogee Law Group PC

(57) ABSTRACT

A method of marking an egg is disclosed and comprises applying radiant energy to the shell of an egg so as to cause discoloration of the eggshell, thereby forming a marking comprising at least a traceability code and a freshness date. Apparatus is also disclosed for applying markings on eggs being processed by an egg-handling machine that is designed and configured to transport a plurality of eggs therethrough, wherein the apparatus comprises a radiant energy source located in proximity to the egg-handling machine, the radiant energy source being configured to apply radiant energy to the eggs as the eggs are transported past the radiant energy source to selectively discolor the shell of the eggs and form markings on the shell, including a freshness date and a traceability code.

17 Claims, 11 Drawing Sheets

Related U.S. Application Data continuation of application No. 11/333,580, filed on Jan. 17, 2006, now Pat. No. 7,951,409, which is a continuation-in-part of application No. 10/542,324, filed as application No. PCT/US2004/000633 on Jan. 12, 2004, now abandoned.

(60) Provisional application No. 60/440,273, filed on Jan. 15, 2003.

(51) Int. Cl.
 *A01K 43/10* (2006.01)
 *B23K 26/06* (2014.01)
 *B23K 26/08* (2014.01)
 *B23K 26/40* (2014.01)
 *B41M 5/26* (2006.01)
 *B41J 2/435* (2006.01)

(52) U.S. Cl.
 CPC ...... *B23K 26/0838* (2013.01); *B23K 26/4035* (2013.01); *B41J 2/435* (2013.01); *B41M 5/262* (2013.01); *G06F 17/30554* (2013.01)

(56) References Cited

U.S. PATENT DOCUMENTS

| | | |
|---|---|---|
| 3,665,148 A | 5/1972 | Yasenchak et al. |
| 3,779,159 A | 12/1973 | Rose et al. |
| 3,916,143 A | 10/1975 | Farrell |
| 4,043,105 A | 8/1977 | Cochran |
| 4,316,720 A | 2/1982 | Ackerman |
| 4,578,329 A | 3/1986 | Holsappel |
| 4,636,043 A | 1/1987 | Bellar |
| 4,652,722 A | 3/1987 | Stone et al. |
| 4,659,902 A | 4/1987 | Swensrud et al. |
| 4,734,858 A | 3/1988 | Schlafly |
| 4,839,181 A | 6/1989 | MacMurray et al. |
| 4,843,958 A | 7/1989 | Egosi |
| 4,900,617 A | 2/1990 | Smith |
| 5,021,631 A | 6/1991 | Ravellat |
| 5,120,631 A | 6/1992 | Kanbayashi et al. |
| 5,120,928 A | 6/1992 | Piliero |
| 5,142,976 A | 9/1992 | Roulleau |
| 5,164,009 A | 11/1992 | Chandler |
| 5,198,843 A | 3/1993 | Ito et al. |
| 5,230,628 A | 7/1993 | Kaneko et al. |
| 5,262,470 A | 11/1993 | Shimotsuma et al. |
| 5,305,244 A | 4/1994 | Newman et al. |
| 5,316,397 A | 5/1994 | Robertson et al. |
| 5,318,449 A | 6/1994 | Schoell et al. |
| 5,335,003 A | 8/1994 | Sugden |
| 5,477,179 A | 12/1995 | Takada et al. |
| 5,478,990 A | 12/1995 | Montanari et al. |
| 5,526,119 A | 6/1996 | Blit et al. |
| 5,546,502 A | 8/1996 | Hart et al. |
| 5,608,429 A | 3/1997 | Hayashihara et al. |
| 5,644,693 A | 7/1997 | Fitzgerald et al. |
| 5,646,765 A | 7/1997 | Laakmann et al. |
| 5,653,900 A | 8/1997 | Clement |
| 5,660,747 A | 8/1997 | Drouillard et al. |
| 5,691,757 A | 11/1997 | Hayashihara et al. |
| 5,724,261 A | 3/1998 | Denny et al. |
| 5,734,412 A | 3/1998 | Hasebe et al. |
| 5,767,477 A | 6/1998 | Sutter, Jr. |
| 5,792,807 A | 8/1998 | Hayashihara et al. |
| 5,798,843 A | 8/1998 | Yamamoto et al. |
| 5,817,243 A | 10/1998 | Shaffer |
| 5,860,810 A | 1/1999 | Faul |
| 5,897,797 A | 4/1999 | Drouillard et al. |
| 5,924,069 A | 7/1999 | Kowalkowski et al. |
| 5,928,842 A | 7/1999 | Shinmoto et al. |
| 5,939,974 A | 8/1999 | Heagle et al. |
| 6,018,135 A | 1/2000 | Weick |
| 6,029,424 A | 2/2000 | McEvoy et al. |
| 6,033,226 A | 3/2000 | Bullen |
| 6,104,966 A | 8/2000 | Haagensen |
| 6,148,249 A | 11/2000 | Newman |
| 6,154,738 A | 11/2000 | Call |
| 6,180,914 B1 | 1/2001 | Jones et al. |
| 6,188,990 B1 | 2/2001 | Brook et al. |
| 6,270,222 B1 | 8/2001 | Herpst |
| 6,409,082 B1 | 6/2002 | Davis et al. |
| 6,421,159 B1 | 7/2002 | Sutter et al. |
| 6,429,889 B1 | 8/2002 | Murokh |
| 6,546,304 B2 | 4/2003 | Thorvaldsson et al. |
| 6,584,982 B1 | 7/2003 | Clay et al. |
| 6,671,698 B2 | 12/2003 | Pickett et al. |
| 6,678,094 B2 | 1/2004 | Sator et al. |
| 6,691,135 B2 | 2/2004 | Pickett et al. |
| 6,732,928 B1 | 5/2004 | Lawlor |
| 6,791,592 B2 | 9/2004 | Assa et al. |
| 6,796,241 B2 | 9/2004 | Catalan et al. |
| 6,810,796 B2 | 11/2004 | Catalan et al. |
| 6,829,000 B2 | 12/2004 | Assa et al. |
| 6,874,000 B2 | 3/2005 | Sholl et al. |
| 6,878,517 B1 | 4/2005 | Benson |
| 6,911,969 B1 | 6/2005 | Nelson et al. |
| 6,995,675 B2 | 2/2006 | Curkendall et al. |
| 7,062,513 B2 | 6/2006 | Beck et al. |
| 7,085,777 B2 | 8/2006 | Beck et al. |
| 7,096,221 B2 | 8/2006 | Nakano |
| 7,194,395 B2 | 3/2007 | Genovese |
| 7,249,006 B2 | 7/2007 | Lombardo et al. |
| 7,349,808 B1 | 3/2008 | Kreiswirth et al. |
| 7,412,461 B2 | 8/2008 | Sholl et al. |
| 7,440,901 B1 | 10/2008 | Dlott et al. |
| 7,575,770 B2 | 8/2009 | Garwood |
| 7,657,740 B2 | 2/2010 | Numao et al. |
| 7,668,754 B1* | 2/2010 | Bridgelall ............... 705/26.9 |
| 7,951,409 B2 | 5/2011 | Parker |
| 8,082,191 B2 | 12/2011 | Omatsu |
| 8,084,712 B2 | 12/2011 | Griffiths et al. |
| 8,455,026 B2 | 6/2013 | Chait et al. |
| 8,455,030 B2 | 6/2013 | Chait et al. |
| 8,499,718 B2 | 8/2013 | Chait et al. |
| 8,544,739 B2 | 10/2013 | Parker |
| 8,657,098 B2 | 2/2014 | Chait et al. |
| 2001/0030179 A1 | 10/2001 | Knieb et al. |
| 2001/0056359 A1 | 12/2001 | Abreu |
| 2002/0011311 A1 | 1/2002 | Carignan et al. |
| 2002/0035439 A1 | 3/2002 | Takeda et al. |
| 2002/0082924 A1 | 6/2002 | Koether |
| 2002/0179580 A1 | 12/2002 | Costin |
| 2003/0004750 A1 | 1/2003 | Teraoka et al. |
| 2003/0006281 A1 | 1/2003 | Thomas et al. |
| 2003/0009239 A1 | 1/2003 | Lombardo et al. |
| 2003/0015507 A1 | 1/2003 | Miller et al. |
| 2003/0018513 A1 | 1/2003 | Hoffman et al. |
| 2003/0036044 A1 | 2/2003 | Pastrick et al. |
| 2003/0069774 A1 | 4/2003 | Hoffman et al. |
| 2003/0074250 A1 | 4/2003 | Burk |
| 2003/0080191 A1 | 5/2003 | Lubow et al. |
| 2003/0083947 A1 | 5/2003 | Hoffman et al. |
| 2003/0177025 A1 | 9/2003 | Curkendall et al. |
| 2003/0177048 A1 | 9/2003 | Jacobson |
| 2003/0206227 A1 | 11/2003 | Assa et al. |
| 2003/0226835 A1 | 12/2003 | Bell |
| 2004/0015318 A1 | 1/2004 | Heller et al. |
| 2004/0054506 A1 | 3/2004 | Singh et al. |
| 2004/0078227 A1 | 4/2004 | Morris |
| 2004/0083201 A1 | 4/2004 | Sholl et al. |
| 2004/0100380 A1 | 5/2004 | Lindsay et al. |
| 2004/0130612 A1 | 7/2004 | Assa et al. |
| 2004/0158447 A1 | 8/2004 | Leger et al. |
| 2004/0172587 A1 | 9/2004 | Lawlor |
| 2004/0177011 A1 | 9/2004 | Ramsay et al. |
| 2004/0203377 A1 | 10/2004 | Eaton et al. |
| 2004/0220855 A1 | 11/2004 | Carignan et al. |
| 2005/0067106 A1 | 3/2005 | Melges |
| 2005/0091113 A1 | 4/2005 | Mitchell et al. |
| 2005/0091124 A1* | 4/2005 | White ............... 705/26 |
| 2005/0118704 A1 | 6/2005 | Malobabic |
| 2005/0131723 A1 | 6/2005 | Sholl et al. |

(56) References Cited

U.S. PATENT DOCUMENTS

| | | | |
|---|---|---|---|
| 2005/0131763 A1 | 6/2005 | Junger | |
| 2005/0226975 A1 | 10/2005 | Drouillard | |
| 2005/0251449 A1 | 11/2005 | Pape et al. | |
| 2005/0261864 A1 | 11/2005 | Edwards et al. | |
| 2005/0261991 A1 | 11/2005 | Kennamer | |
| 2005/0267790 A1 | 12/2005 | Skalsky | |
| 2005/0273369 A1 | 12/2005 | Ota et al. | |
| 2006/0004702 A1 | 1/2006 | St. John et al. | |
| 2006/0012821 A1 | 1/2006 | Franklin et al. | |
| 2006/0059137 A1 | 3/2006 | Walker | |
| 2006/0138105 A1 | 6/2006 | Parker | |
| 2006/0161392 A1 | 7/2006 | Sholl et al. | |
| 2006/0187048 A1 | 8/2006 | Curkendall et al. | |
| 2006/0259471 A1 | 11/2006 | Droubie et al. | |
| 2006/0265584 A1 | 11/2006 | Bourret et al. | |
| 2006/0271555 A1 | 11/2006 | Beck et al. | |
| 2007/0067177 A1 | 3/2007 | Martin et al. | |
| 2007/0086822 A1 | 4/2007 | Sato | |
| 2007/0088634 A1 | 4/2007 | Matsumoto et al. | |
| 2007/0095905 A1 | 5/2007 | Kadaba | |
| 2007/0170242 A1* | 7/2007 | Fobbe et al. | 235/375 |
| 2007/0221727 A1 | 9/2007 | Reznik | |
| 2007/0229649 A1 | 10/2007 | Parker | |
| 2007/0292559 A1 | 12/2007 | Garwood | |
| 2008/0086321 A1 | 4/2008 | Walton | |
| 2008/0245859 A1 | 10/2008 | Saito et al. | |
| 2008/0305827 A1* | 12/2008 | Barnes et al. | 455/556.1 |
| 2009/0222285 A1 | 9/2009 | Silverbrook et al. | |
| 2009/0234756 A1 | 9/2009 | Omatsu | |
| 2009/0271243 A1 | 10/2009 | Sholl et al. | |
| 2010/0145730 A1 | 6/2010 | Abreu | |
| 2011/0004485 A1 | 1/2011 | Sholl et al. | |
| 2011/0035326 A1 | 2/2011 | Sholl et al. | |
| 2011/0040660 A1 | 2/2011 | Allison et al. | |
| 2011/0140380 A1* | 6/2011 | Ulrich | 280/33.992 |
| 2011/0174223 A1 | 7/2011 | Chait et al. | |
| 2011/0175974 A1 | 7/2011 | Chait et al. | |
| 2011/0176901 A1 | 7/2011 | Chait et al. | |
| 2011/0177206 A1 | 7/2011 | Chait et al. | |
| 2011/0177207 A1 | 7/2011 | Chait et al. | |
| 2011/0177208 A1 | 7/2011 | Chait et al. | |
| 2011/0177217 A1 | 7/2011 | Chait et al. | |
| 2011/0258171 A1 | 10/2011 | Parker | |
| 2012/0114820 A1 | 5/2012 | Griffiths et al. | |
| 2012/0180436 A1 | 7/2012 | Chait et al. | |
| 2012/0253883 A1 | 10/2012 | Sholl et al. | |
| 2013/0017296 A1 | 1/2013 | Chait et al. | |
| 2013/0110580 A1 | 5/2013 | Sholl et al. | |
| 2013/0212981 A1 | 8/2013 | Chait et al. | |
| 2014/0057028 A1 | 2/2014 | Chait et al. | |

FOREIGN PATENT DOCUMENTS

| | | |
|---|---|---|
| DE | 3722176 | 1/1989 |
| DE | 3836821 | 5/1990 |
| DE | 247831 | 4/1991 |
| DE | 0291471 A5 | 4/1991 |
| DE | 4125007 | 1/1993 |
| DE | 4322252 | 1/1995 |
| DE | 1019109 | 10/2001 |
| EP | 0421837 | 4/1991 |
| EP | 0684144 | 11/1995 |
| EP | 1489538 A1 | 12/2004 |
| ES | 2033185 | 3/1993 |
| FR | 2654662 | 5/1991 |
| FR | 2621529 | 4/1999 |
| FR | 2776790 A1 | 10/1999 |
| GB | 2131767 A | 6/1984 |
| GB | 2365165 A | 2/2002 |
| JP | 55034966 | 3/1980 |
| JP | 58090985 | 5/1983 |
| JP | 61206692 | 9/1986 |
| JP | 1108940 | 4/1989 |
| JP | 1196259 | 8/1989 |
| JP | 260552 | 3/1990 |
| JP | 3138092 | 6/1991 |
| JP | 3211068 | 9/1991 |
| JP | 3221290 A | 9/1991 |
| JP | 5146887 | 6/1993 |
| JP | 7011183 | 1/1995 |
| JP | 1128588 A | 2/1999 |
| JP | 2000168157 | 6/2000 |
| JP | 2001136859 | 5/2001 |
| JP | 2004342097 A1 | 12/2004 |
| JP | 2004344040 A1 | 12/2004 |
| JP | 2005138169 A | 6/2005 |
| JP | 2006018420 A1 | 1/2006 |
| WO | WO 01/35376 A1 | 5/2001 |
| WO | WO 01/56789 | 8/2001 |
| WO | WO 01/93036 A1 | 12/2001 |
| WO | WO 01/97555 A2 | 12/2001 |
| WO | WO 01/97556 A2 | 12/2001 |
| WO | WO 02/37375 A1 | 5/2002 |
| WO | WO 03/048725 A2 | 6/2003 |
| WO | WO 03/069508 A2 | 8/2003 |
| WO | WO 03/098388 A2 | 11/2003 |
| WO | WO 2006/044689 A2 | 4/2006 |
| WO | WO 2007/016937 A1 | 2/2007 |
| WO | WO 2009/132237 A2 | 10/2009 |
| WO | WO 2009/132237 A3 | 10/2009 |

OTHER PUBLICATIONS

[No Author Listed], Center for Disease Control (CDC) "What is FoodNet?", available at http://www.cdc.gov/foodnet, Aug. 2004. 5 Pages.

[No Author Listed], Food Safety and Inspection Service. *Salmonella* Enteritidis Risk Assessment: Shell Eggs and Egg Products. Final Report, available at www.fsis.usda.gov/OPHS/risk/, Aug. 10, 1998.

[No Author Listed], National Academy of Sciences. Countering Agricultural Bioterrorism. Available at http://books.nap.edu/catalog/10505.html, executive summary only, 2004.

[No Author Listed], National Research Council "Making the Nation Safer: The Role of Science and Technology in Countering Terrorism", Committee on Science and Technology for Countering Terrorism, Washington, DC: National Academies Press, 2002. ISBN 0-309-08481-4 HV6431.M354. 62 Pages.

[No Author Listed], Qtek 9090-Full phone specification, http://www.gsmarena.com/qtek_9090-1171.php, 3 pages, 2005.

[No Author Listed], Quantitative Assessment of the Relative Risk to Public Health from Foodborne Listeria monocytogenes Among Selected Categories of Ready-to-Eat Foods, Center for Food Safety and Applied Nutrition Food and Drug Administration, U.S. Department of Health and Human Services, Sep. 2003, pp. 1-272.

[No Author Listed], U.S. Department of Agriculture National Inter-Agency Incident Management System (NIIMS): Operational System Description 2004.

[No Author Listed], Zebra Technologies "Bar Coding and RFID: The Key to Traceability and Safety in the Foodservice Supply Chain", white paper, 2004.

Aginfolink, AgInfoLink Products and Services. Downloaded from www.aginfolink.com, Apr. 17, 2003. 8 Pages.

Auernhammer, The Role of Mechatronics in Crop Product Traceability. Agricultural Engineering International: the CIGR Journal of Scientific Research and Development, Invited Overview Paper, vol. IV, Oct. 2002. Presented at the Club of Bologna meeting Jul. 27, 2002. Chicago, IL. USA. 21 Pages.

Axtell et al., Improving Recalls at the Food Safety Inspection Service. Report of the Recall Policy Working Group, Food Safety and Inspection Service, U.S. Department of Agriculture, Aug. 1998.

Bailar III, Ensuring Safe Food: An Organizational Perspective. In Layne, S.P. et al., eds. FirePower in the Lab: Automation in the Fight Against Infectious Diseases and Bioterrorism. Washington, DC: Joseph Henry Press, NAS, pp. 133-142, 2000.

Bantham et al., Creating Value Through Traceability Solutions: A Case Study. Submitted by FoodOrigins, to the International Food and Agribusiness Management Association, Texas A&M University, May 19, 2003. 12 Pages.

(56) References Cited

OTHER PUBLICATIONS

Barrett et al., If Smallpox Strikes Portland . . . Scientific American, Feb. 21, 2005. 8 Pages.
Beamon, Supply Chain Design and Analysis: Models and Methods. International Journal of Production Economics, vol. 55, No. 3, Aug. 15, 1998, pp. 281-294.
Benson, Simulation Modeling and Optimization Using ProModel. Proceedings of the 1997 Winter Simulation Conference, Dec. 7-10, 1997, pp. 587-593.
Bidawid et al., Contamination of Foods by Food Handlers: Experiments on Hepatitis A Virus Transfer to Food and Its Interruption. Applied and Environmental Microbiology, vol. 66, No. 7, Jul. 2000, pp. 2759-2763.
Boyle, A Recipe for Disaster. Fortune Magazine, Nov. 14, 2005. 3 Pages.
Bruemmer, Food Biosecurity. Journal of the American Dietetic Association, vol. 103, No. 6, Jun. 2003. pp. 687-691.
Cellarosi et al., Detecting Outbreaks by Time Series Analysis. Dept. of Electronics, Computer Science and Systems, Proceedings of the 15$^{th}$ IEEE Symposium on Computer-Based Medical Systems, 2002, pp. 1-6.
Chalk, The U.S. Agricultural Sector: A New Target for Terrorism? Jane's International Security News, Feb. 9, 2001. 8 Pages.
Chowhound, "Why are they stamping eggs with a use by date?", http://chowhound.chow.com/topics/338070, dated Oct. 29, 2006.
Cipra, "Hot Topics" Workshop Takes a Logistical Look at Biodefense. SIAM News. vol. 35, No. 10, Dec. 2002. 3 Pages.
Clause, Supply Chains, Quality Assurance and Traceability Using ISO 9000-2000 in Agriculture. presented at the symposium "Product Differentiation and Market Segmentation in Grains and Oilseeds: Implications in Transition." Economic Research Service, USDA, and The Farm Foundation, Jan. 27-28, 2003. 8 Pages.
Crawford, A Conversation on Food Safety and Global Security. Remarks to the Open Forum, U.S. Department of State, downloaded from www.state.gov/s/p/of/proc/tr/13454.htm, Sep. 6, 2002. 3 Pages.
Durand-Wayland Labeling Systems, http://www.durand-wayland.com/label/8/7/2006, downloaded Aug. 7, 2006.
Eubank, Scalable, Efficient Epidemiological Simulation. Proceedings of the 2002 ACM Symposium on Applied Computing, Mar. 11-14, 2002, pp. 139-145.
European Search Report from related application, PCT/US08/03160, filed Mar. 11, 2008, mailed Aug. 12, 2008.
Food Net Annual Report 2000, Published 2001. pp. 1-36.
Gan et al., Distributed Supply Chain Simulation Across Enterprise Boundaries. Proceedings of the 2000 Winter Simulation Conference, Dec. 10-13, 2000, pp. 1245-1251.
Gast et al., Minimizing Microbial Food Safety Hazards for Fresh Fruits and Vegetables: Sanitation and Traceback. Kansas State University Agricultural Experiment Station and Cooperative Extension Servic, Document MF-2482. Dec. 2000. 6 Pages.
Glemot, Issues and Tools of Traceability at Growing and Shipping Stages. Infos-Ctifl, vol. 166, pp. 24-28, Nov. 2000. With English translation of French article.
Golan et al., Traceability for Food Marketing & Food Safety: What's the Next Step? Agricultural Outlook, Economic Research Service/USDA, pp. 21-25, Jan./Feb. 2002.
Golan et al.,Traceability in the U.S. Food Supply: Economic Theory and Industry Studies. U.S. Department of Agriculture Economic Research Service, Agricultural Economic Report No. 830, Mar. 2004.
Gorris et al., The Food Micromodel for Prediction of Growth of Foodborne Pathogens. Voedingsmiddelentechnologie, vol. 26, No. 5, pp. 36-39, 1993.
Gorris et al., The Impact of Risk Analysis on Food Safety. Address presented during the inauguration as the new holder of the European Chair in Food Safety Microbiology at Wageningen University, Oct. 3, 2002.
Greg Stiles, "Laser Labeling," Mail Tribune, Sep. 19, 2004.

Guzewich et al., FDA's Role in Traceback Investigation for Produce. Food Safety Magazine, Dec. 2000/Jan. 2001.
Hadfield, Computerweekly.com, McDonald's cuts inspection report times as PDA-based system goes on global menu, http://www.computerweekly.com/feature/McDonalds-cuts-inspection-report-times-as-PDAbased-system-goes-on-global-menu, 2005. 1 Page.
Harlander et al., Software Systems for Food Safety and Defense. AIB Update, May/Jun. 2007, pp. 9-10.
Heflin et al., Simulation Modeling and Optimization Using ProModel. Proceedings in the 1998 Winter Simulation Conference, Dec. 13-16, 1998, pp. 191-197.
Herrmann, Traceability in the U.S. Grain and Plant Protein Feed Ingredient Industries. White Paper, The American Feed Industry Association, Jul. 2, 2002. 19 Pages.
International Preliminary Report on Patentability for Application No. PCT/US2007/000005 mailed on Jul. 31, 2008.
International Search Report and Written Opinion for Application No. PCT/US2007/000005 mailed on Jun. 13, 2008.
International Search Report for Application No. PCT/US2003/031887 mailed Aug. 24, 2004.
International Search Report and Written Opinion for Application No. PCT/US2005/037062 mailed Oct. 11, 2006.
Jaine, A Predictive Modeling and Decision-Making Tool to Facilitate Government and Industry Response to an International Contamination of the Food Supply. Proceedings of the Institute of Food Technologists' First Annual Food Protection and Defense Research Conference, Nov. 3-4, 2005. 16 Pages.
Joppen, Food Terror. Food Engineering and Ingredients, vol. 28, No. 4, Aug. 2003. 2 Pages.
Jouglard, Device and Procedure that Enables Tracing the History of a Food Product through a Productoin, Transformation and Marketing Chain. translation of French Patent Document FR-2776790-Al, Oct. 1, 1999.
Kleer et al., Importance of Predictive Microbiology for Risk Minimization in Food Production Processes. Fleischwirtschaft, vol. 81, No. 6, pp. 99-103, 2001.
Koopman, Responding to an Infection Transmission Emergency. PowerPoint™. presentation, IMA Special "Hot Topics" Workshop: Operational Modeling and BioDefense: Problems, Techniques and Opportunities, Sep. 28, 2002. 16 Pages.
Labuza, Food Bio-Security: Case Studies in the Food Distribution Chain. PowerPoint™. presentation, Department of Food Science and Nutrition, University of Minnesota, 2004. 42 Pages.
Lambert, Agroterrorism: The Threat to America's Breadbasket. Statement before the Senate Committee on Governmental Affairs, available from http://govt-aff.senate.gov, Nov. 19, 2003. 14 Pages.
Lammerding et al., Quantitative Risk Assessment: An Emerging Tool for Emerging Foodborne Pathogens. Emerging Infectious Diseases, vol. 3 Oct./Dec. 1997, pp. 483-487.
Layne, Firepower in the lab: Automation in the fight against infectious diseases and bioterrorism. Washington DC, Joseph Henry Press, pp. 133-163, 2001 (Synopsis Only).
Machine translation of Japan Patent document JP-2000-168,157, May 2010.
Machine translation of Japan Patent document JP-2000-263,276, May 2010.
Machine translation of Japan Patent document JP2003-290,939, May 2010.
Madison et al., U.S. egg production on the sunny side in the 1990's. Agricultural Outlook. U.S. Department of Agriculture, Economic Research Service. May 1997:12-4.
Maslanka et al., Foodborne Pathogen and Toxin Diagnostics. In Layne, S.P. et al., eds. FirePower in the Lab: Automation in the Fight Against Infectious Diseases and Bioterrorism. Washington, DC: Joseph Henry Press, NAS, pp. 143-163 2000.
Material Flow, Jan. 2005, vol. 46, pp. 88-93.
Michael, FDA Plans Food-Tracking System. FCW.com, Apr. 28, 2003. 2 Pages.
Michael, Software to Predict Food Dangers. FCW.com, Aug. 11, 2003.
Murano, Perspectives on Food Security. Speech presented by the Under Secretary for Food Safety at the Amarillo Farm and Ranch

(56) References Cited

OTHER PUBLICATIONS

Show, Amarillo, Texas, U.S. Department of Agriculture, available from http://www.fsis.usda.gov, Dec. 2, 2003. 5 Pages.
Nganje et al., Terrorism and the Grain Handling System in Canada and the United States. Principal Session 2, paper 3, Canadian Agricultural Economics Society Annual Meeting, Jul. 26-30, 2003, Montreal Canada. J. Can. Agric. Econom. Society, 38 Pages.
Opara et al., Food Traceability from Field to Plate. Outlook on Agricultural, vol. 30, No. 4, 2001, pp. 239-247.
Opara, Engineering and Technological Outlook on Traceability of Agricultural Production and Products. Agricultural Engineering International: the CIGR Journal of Scientific Research and Development, vol. IV, Dec. 2002, pp. 1-13.
Opara, Traceability in Agriculture and Food Supply Chain: a Review of Basic Concepts, Technological Implications, and Future Prospects. Food, Agriculture & Environment, vol. 1, No. 1, Jan. 2003, pp. 101-106.
Padmos et al., How i2 Integrates Simulation in Supply Chain Optimization. Proceedings of the 1999 Winter Simulation Conference, Dec. 5-8, 1999, pp. 1350-1355.
Prewitt, Chains turn to technology to battle food-borne illness, 2005 http://findarticles.co/p/articles/mi_m3190/is_16_39/ai_n13652054/ , 4 Pages.
Scott et al., The Food Industry's Response to Ensuring Food Security and Safety. PowerPoint™ presentation, Bioterrorism and Food Security: Issues and Challenges, Oct. 28-19, 2002.
Sholl, Security of the Food Supply: Detection, Identification and Response. PowerPoint™ presentation, Apr. 22, 2004.
Silliker et al., International Commission on Microbiological Specifications for Foods (ICMSF) "Microorganisms in Foods, vol. 4", Oxford: Blackwell Scientific Publications, pp. 1-43 and 207-263, 1988. ISBN 0-632-02181-0. QR115.I46 1988.
Verbeke, The Emerging Role of Traceability and Information in Demand-Oriented Livestock Production. Outlook on Agricultural, vol. 30, No. 4, pp. 249-255, 2001.
Wein et al., Analyzing a Bioterror Attack on the Food Supply: The Case of Botulinum Toxin in Milk. Proceedings of the National Academy of Sciences, vol. 102, No. 28, Jul. 12, 2005, pp. 9984-9989.
Weisman, R., "Born free eggs etches data on its fragile wares", http://www.boston.com/business/articles/2005/09/19/born_free_eggs_etches_data_on_its_fragile_wares/?rss_id=Boston+Globe+---+Business+News, dated Sep. 19, 2005.
Wijtzes et al., A Decision Support System for the Prediction of Microbial Food Safety and Food Quality. International Journal of Food Microbiology, vol. 42, Issue 1-2, Jun. 30, 1998, pp. 79-90.
Wilson et al., Food Safety and Traceability in the Agriculture Supply Chain: Using the Internet to Deliver Traceability. Supply Chain Management, vol. 3, No. 3, No. 3, p. 127, 1998.
Woo, The Evolution of Terrorism Risk Modeling. Journal of Reinsurance, London, England, Apr. 22, 2003. 9 Pages.
Yakov Horenstein, "How Lasers Could Print Ads on Food," Daily Mail, Mar. 4, 1999.
Zwietering et al., A Decision Support System for Prediction of the Microbial Spoilage of Foods. Journal of Food Protection, vol. 55, No. 12, pp. 973-979, Dec. 1992.
Zwietering., et al. Modeling of Bacterial Growth as a Function of Temperature. Applied and Environmental Microbiology, pp. 1094-1101, Apr. 1991.

\* cited by examiner

| Your Egg Information | |
|---|---|
| Egg Trace Ability Code | 1035B054A01 |
| Producer | Parker Reichman |
| Site Code | P1036 |
| Producer Address | CR 171, Murphy, North Carolina |
| Process Date | July 23, 2005 |
| Process Time | 4:05 pm |
| Grader | A |
| Packer Lane | 3 |
| Customer | Wal-Mart |
| USDA Certified | Yes |
| Packaging | 18Pk Box 60/16s |
| Color | White |
| Washer Temp | 103° F |
| Cooler Temp | 45° F |

| Key Egg Dates | |
|---|---|
| Packed Date | July 23, 2005 |
| Sell By Date | August 10, 2005 |
| Use By Date | August 10, 2005 |
| Expiration Date | August 20, 2005 |

METHODS AND APPARATUS FOR STORING AND RETRIEVING INFORMATION RELATING TO EDIBLE OBJECTS

This application is a divisional application of U.S. application Ser. No. 13/090,614, filed on Apr. 20, 2011, which is a continuation application of U.S. application Ser. No. 11/333,580, filed on Jan. 17, 2006, which is a continuation-in-part of U.S. application Ser. No. 10/542,324, filed on Apr. 4, 2007, which is a National Stage of International Application No. PCT/US2004/000633, filed on Jan. 12, 2004, which claims the benefit of U.S. Provisional Application No. 60/440,273, filed on Jan. 15, 2003, all of which are herein incorporated by reference in their entireties.

BACKGROUND OF THE INVENTION

The present invention relates to an egg marked with advertisements, a freshness date and a traceability code, and the method and apparatus used to create those eggs. Advertising on eggs provides a unique medium for advertisers to reach consumers. Attempts have been made to take advantage of this medium of advertising as described in U.S. Pat. No. 4,843,958, to Egosi and titled "Method and Apparatus for Applying Advertisements to Eggs." However, there is still a need for an easy application of advertising on eggs. There is also a need to put a date on eggs, to ensure customers that the egg is fresh.

The present invention addresses this need. The present invention provides an egg that has a freshness date, a traceability code and one or more advertising messages applied on it. The traceability code enables the consumer to access one or more websites and input the code and obtain information relating to the history of the egg. The freshness date tends to cause the consumer to scrutinize the egg, to confirm that it is fresh. As the consumer looks at the egg, he or she will tend to view the advertisement as well. Thus, providing both the freshness date and the advertisement enhances the efficacy of the advertisement. Moreover, the cost of the marking operation is at least partially offset by the economic value of the advertisement. Further aspects of this invention provide methods and apparatus for applying markings to eggs.

SUMMARY OF THE INVENTION

One aspect of embodiments of the present invention includes a method of marking an egg by applying radiant energy to the shell of an egg so as to cause discoloration of the eggshell to form a permanent marking. The markings include text and graphics, and can include an advertisement, a freshness date, and a traceability code or most preferably includes all of this information. A laser is preferably employed as the radiant energy source. Desirably, the radiant energy is applied so as to leave much of the area of the eggshell unaffected so as to form contrast between the unaffected areas and the marking. The method preferably forms the markings while the egg rapidly moves through a predetermined region of an egg handling machine.

In the preferred method according to the present invention, the markings are made by laser etching without applying a foreign material to the eggshell.

A preferred embodiment comprises an apparatus for applying markings on eggs that is operable in association with an egg-handling machine that performs washing, candling, grading and packing of eggs. The apparatus comprises a radiant energy source located in proximity to the egg-handling machine, so that the radiant energy source can apply radiant energy to the egg to discolor the eggshell and form the markings. There is provided an egg bearing an information marking on it, wherein the marking is formed at least in part by discolored material on the eggshell. The egg may include the marking being formed entirely by discolored material of the eggshell. The egg may also be raw or pasteurized.

In some embodiments, a method of marking an egg is provided, comprising applying radiant energy to the shell of an egg so as to cause discoloration of the eggshell, thereby forming a marking comprising at least a traceability code and a freshness date. The marking may further comprise an advertisement. The radiant energy may be applied by a laser. The markings may be formed by a generally stationary radiant energy source as the egg is transported by said source.

In some further embodiments, an apparatus is provided for applying markings on eggs being processed by an egg-handling machine that is designed and configured to transport a plurality of eggs therethrough, said apparatus comprising a radiant energy source located in proximity to the egg-handling machine, said radiant energy source being configured to apply radiant energy to the eggs as the eggs are transported past said radiant energy source to selectively discolor the shell of the eggs and form markings on the shell, including a freshness date and a traceability code. The egg-handling machine may be an egg-grading machine.

In some further embodiments, a method of marking at least one egg is provided, comprising: conveying the egg to a marking station having at least one laser marking device configured to apply laser energy of sufficient intensity to etch indicia in the outer surface of the shell of the egg; and activating the laser device to apply laser energy to the egg and thereby etch the indicia in the outer surface of the egg shell, said indicia comprising at least a freshness date and a traceability identification. The indicia may further comprise advertising text and/or graphics. The applied laser energy may ablate and melt surface egg shell material to an approximate depth within the range of about 25 to about 200 micrometers, where the depth may be within the range of about 50 to about 90 micrometers. The applied laser energy may ablate and melt surface egg shell material to an approximate depth that is within the range of about 5 to about 8 percent of the thickness of the egg shell. The traceability identification may comprise one or more items of information selected from the group consisting of: a traceability code; an identification of the producer of the egg; an address of the producer; a process date of the egg; a time of processing the egg; an identification of the grader of the egg; an identification of the packer lane in which the egg was processed; an identification of the customer who purchased the egg; an indication of the type of packaging of the egg; an indication of the color of the egg; an indication of the temperature at which the egg was washed; an indication of the temperature of the cooler in which the egg was placed; and an identification of any advertising indicia that was placed on the egg.

In some further embodiments, an egg is provided having indicia on an outer portion of its shell, said indicia comprising a freshness date and a traceability code that specifies unique identification and history information regarding the egg. The indicia may be laser etched on the outer portion of its shell. The unique identification and history information may comprise one or more items of information selected from the group consisting of: a traceability code; an identification of the producer of the egg; an address of the producer; a process date of the egg; a time of processing the egg; an identification of the grader of the egg; an identification of the packer lane in which the egg was processed; an identification of the customer who purchased the egg; an indication of the type of packaging of the egg; an indication of the color of the egg; an indication of the temperature at which the egg was washed; an indication of the temperature of the cooler in which the egg was placed; and an identification of any advertising indicia that was placed on the egg. The traceability code may be capable of being inserted into a field of at least one predetermined Internet website, which website is configured to display said identification and history information of the egg.

In some further embodiments, an egg is provided having the outer surface of its shell laser etched with a freshness date and a traceability code that specifies unique identification and history information regarding the egg.

In some further embodiments, a system is provided for processing eggs and providing information relating to eggs that are processed through the system, the system comprising egg grading, candling, marking and packing stations, said system including a central processing unit having associated memory that is configured to receive and store data relating to eggs that are processed through the system, said system comprising: conveying the eggs through said egg grading station where said eggs are graded and data relating to the grade of each egg is transmitted to said central processing unit; conveying the eggs through said egg candling station where said eggs are candled and data relating to the candling of each egg is transmitted to said central processing unit; conveying the eggs through said egg marking station where said eggs are marked with at least a freshness date and a traceability code that specifies unique identification and history information regarding the egg; storing data relating to the marking of each egg in memory associated with said central processing unit; and conveying the eggs through said egg packing station where data relating to the packaging of each egg is transmitted to said central processing unit, said central processing unit being operatively connected to a predetermined website that is accessible through the Internet, wherein said identification and history information regarding an individual egg is accessible by inserting its traceability code in a predetermined field of said website. The markings may further comprise advertising indicia. The marking station may further comprise at least one laser.

For a better understanding of the present invention, reference is made to the following description, taken in conjunction with the accompanying drawings.

DETAILED DESCRIPTION

Figure 1:
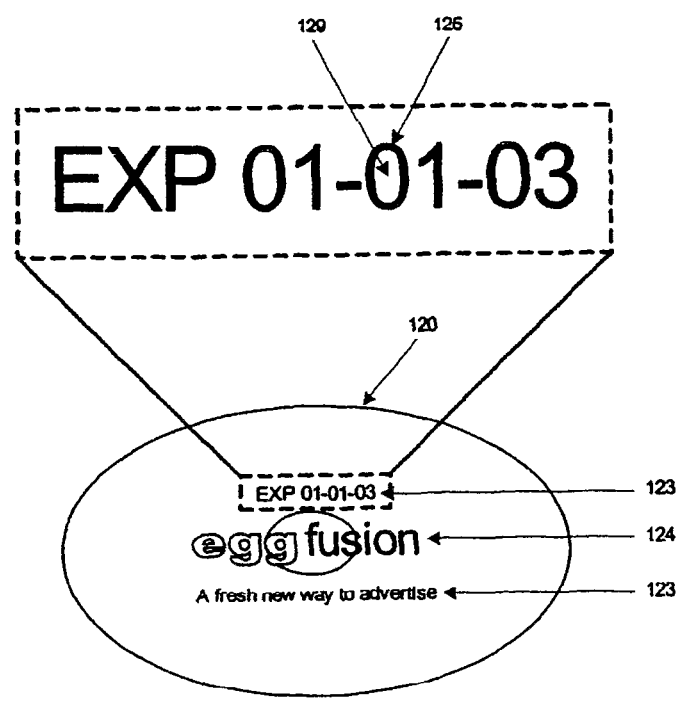
FIG. 1 is a diagram depicting an egg bearing markings using method and apparatus embodiments of the present invention.

Referring to FIG. 1, an egg 120 is provided with markings (i.e., indicia). The markings include text 123 and graphics 124. The markings are formed by discoloring material of the shell to form text 123 and graphics 124, by discoloring some material of the shell, such as that which forms the number 0 as indicated at 125 and leaving other areas of the shell unaffected, such as the area inside the number 0, as indicated at 129. The discoloration may also be done variably so as to form a gradient of discoloration to form the graphics 124, or to create a variety of text 123 such as bold text, italic text, or any type of text font. That is, some areas may be more discolored than others as, for example, by exposing them to radiant energy for a higher intensity or longer duration than other areas. The egg itself preferably is a raw chicken egg, although other edible raw eggs such as, duck, goose or ostrich eggs can be used. Also, the markings on can be applied to precooked eggs, as for example, boiled or microwaved eggs.

Figure 2:
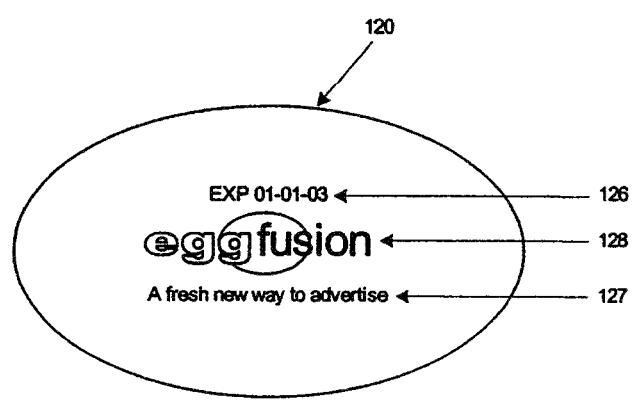
FIG. 2 is a diagram of another view of an egg bearing markings using method and apparatus embodiments of the present invention.
Figure 3:
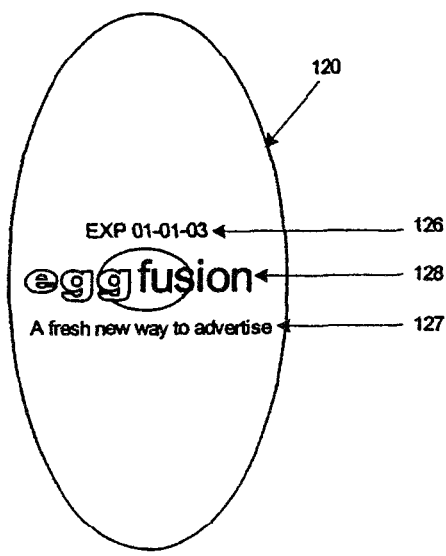
FIG. 3 is a diagram of another view of an egg bearing markings using method and apparatus embodiments of the present invention.
Figure 4:
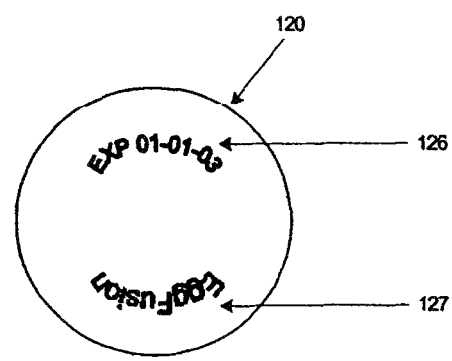
FIG. 4 is a diagram of a top view of an egg bearing markings using method and apparatus embodiments of the present invention.

The text and graphics may be applied horizontally (FIG. 2), vertically (FIG. 3), or on top (FIG. 4) of the egg 120. The text and graphic discolorations can be controlled to form a freshness date 126 and an advertisement 127, 128. The freshness date 126 may also include a traceability code 135 (see FIG. 10) to identify the origin of the egg. The advertisement includes a tag line or other information 127 and/or a logo 128. Most preferably, the egg 120 includes a freshness date 126, a tag line 127, a logo 128 and a traceability code 135. The advertisement, comprised of at least the tag line 127 and logo 128, may include a trademark, slogan, or any other promotional text or graphics affiliated with conveying information for advertising.

Figures 12, 13:
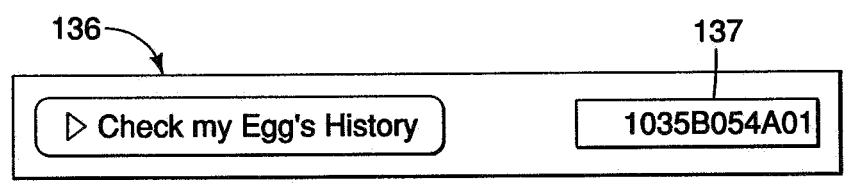
FIG. 12 is another table indicating history and aging information that may be supplied on at least one website when a traceability code of an egg is entered in a predetermined window located on a website.
FIG. 13 is a diagram depicting a display that included the predetermined window for entering a traceability code of an egg, wherein the display may be provided at one or more websites.

The freshness date 126 is provided to reassure consumers about the expiration date of the particular egg 120. The traceability code 135 enables a consumer, for example, to obtain detailed historical information regarding the location of where the egg was produced in order to assist in consumer alerts. This detailed historical information accessible to the consumer by virtue of the historical information being located in a database that is generated during the processing of eggs during the egg-handling and marking of the egg. The eggs that are sold with the above described markings will initially be sold by safety conscious grocery stores and chains that recognize the need to provide their customers with information about the freshness of the eggs they sell. Since most large grocery stores and chains have websites they maintain for their and their customer's benefit, they will have a display, such as display 136 shown in FIG. 13, located prominently on their website that has a window 137 in which a consumer can enter the alpha-numeric identification of the egg they wish to inquire about. When they do so, detailed historical data such as that shown in FIG. 11 will be shown which provides a wealth of information about the history of the egg. For example, it can include all of the items shown in the table of FIG. 11, as well as other information that can include an indication of whether the eggs are laid by chickens that are caged, free range, or caged in a certain sized cage, the diet, supplements and medication the chickens are given, among other items.

With regard to the expiration date, there is not consistency with regard to what such a date indicates. The information that can be provided by the table of FIG. 12 cuts through the ambiguity of terms that are commonly used at the present time by providing information relating to each of them. Importantly, the date that they were processed and packed is indicated and this is nearly always the date that they were laid by chickens. "Sell by" and "use by" dates are indicated and an expiration date is also indicated. While the FDA or other governmental agency may dictate expiration dates in the future, it is presently believed that it is safe to consume refrigerated eggs within 30 days of their packing date.

Figures 10, 11:
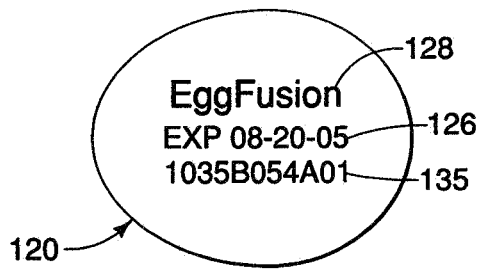
FIG. 10 is another diagram depicting an egg bearing markings using method and apparatus embodiments of the present invention.
FIG. 11 is a table indicating history information that may be supplied on at least one website when a traceability code of an egg is inserted in a predetermined window located on a website.

While each egg is preferably provided with a unique traceability code, it should be understood that having several eggs with the exact same traceability code is within the spirit and scope of the present invention. For example, if all eggs run through a particular line, within a few minutes of one another, and all or nearly all of the items of information shown in the table of FIG. 11 are the same, the fact that they had the same traceability code should not avoid infringement. In other words, the word 'unique' in this context, means that the traceability code will enable a customer to obtain all relevant historical information relating to any egg by accessing the database through the website or otherwise. In this regard, a consumer not having a computer should be able to obtain such information from the seller of the egg by telephone or direct inquiry at the seller's store, for example.

Radiant energy as, for example, electromagnetic radiation such as visible, infrared or ultraviolet light, can be used to discolor the eggshell. The radiant energy can be controlled to only discolor a targeted print area 125 of the eggshell. Some areas of the egg can be left unaffected 129 (see FIG. 1). The discoloration on the eggshell is easily viewable because of the contrast of the eggshell color 129 to the discoloration 125 from the radiant energy. A significant benefit of the use of laser marking is that brown eggs have etched indicia that is a contrasting white color, while white eggs have etched indicia that is a contrasting dark brown color. The discoloration 125 can be used to form indicia or marking information on the eggs. The discoloration to form text and graphics can be applied generally simultaneously by one or more radiant energy source.

No foreign material must be added to the eggshell in order for the radiant energy to discolor the eggshell. Thus, no foreign material such as any ink or radiant energy sensitive material that could react with the radiant energy needs to be added to form a marking. The radiant energy is applied to the natural eggshell. Thus, the marking most desirably is formed solely by the effect of the radiant energy on the normally occurring materials of the eggshell itself. This provides several significant benefits. The egg can be properly represented to the consumer as a product with no additives or contaminants. Moreover, because it is not necessary to apply additional materials for purposes of the marking process, it is unnecessary to add the equipment needed contact the egg with a foreign substance. This greatly simplifies the task of performing the process inline in the production environment of an existing high-speed egg handling apparatus.

In a method according to an embodiment of the present invention, a radiant energy source 110 (FIG. 5) in proximity of an egg 120 directs radiant energy 112 towards the egg 120. Radiant energy source 110 desirably includes a laser such as a C02 gas laser adapted to provide light at about 10.6 nm wavelength, at a minimum of 25 watts, and a projected maximum of 200 watts radiated power, in a beam projected from approximately 100 mm at the surface of the egg. When operated in this power range, the beam ablates and melts the outer surface material from the egg shell. The structural integrity of the egg shell is not affected because the etching by the beam only affects the outer approximately 50 to approximately 90 micrometers of the egg shell, which is approximately 5% to approximately 8% of the thickness of the egg shell. The beam is directed onto those areas of the egg, which are to be discolored and turned on and off so as to provide a series of pulses, the beam being "on" for about 60 milliseconds during each pulse. During this pulsed actuation, the beam is swept across those areas of the egg surface, which are to be discolored The sweeping motion may be performed in any manner which will provide the desired relative motion of the beam and the egg. Since the preferred embodiments will operate in association with an egg-handling machine which moves eggs at an extremely rapid speed, the beam must be rapidly moved to produce the desired indicia and also compensate for the speed of movement of the eggs past the laser apparatus, which is preferably stationary. For example, the radiant energy source 110 may include a beam-sweeping unit incorporating conventional optical elements such as movable or variable lenses, mirrors or prisms adapted to deflect the beam and to vary the deflection with time. One suitable radiant energy source is a laser of the type sold under the designation DSL-1 Series (in all available wattages) by the Domino Amjet and Domino Printing Company of Gurnee, Ill., U.S.A.

Figure 5:
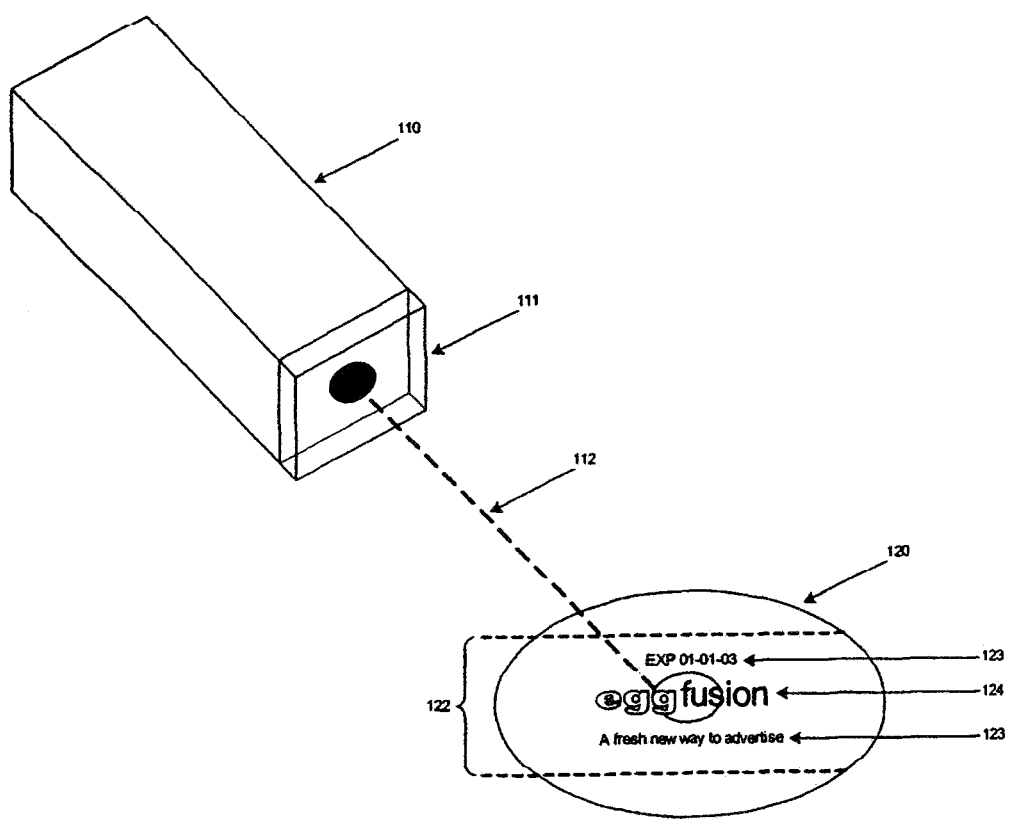
FIG. 5 is a diagrammatic view depicting apparatus for performing an embodiment of the method of the present invention.

Using such equipment, and referring to FIG. 5, radiant energy 112 is directed towards a target print area 122 of egg 120. Radiant energy 112 discolors egg 120 to form text 123 and graphics 124.

Figure 6:
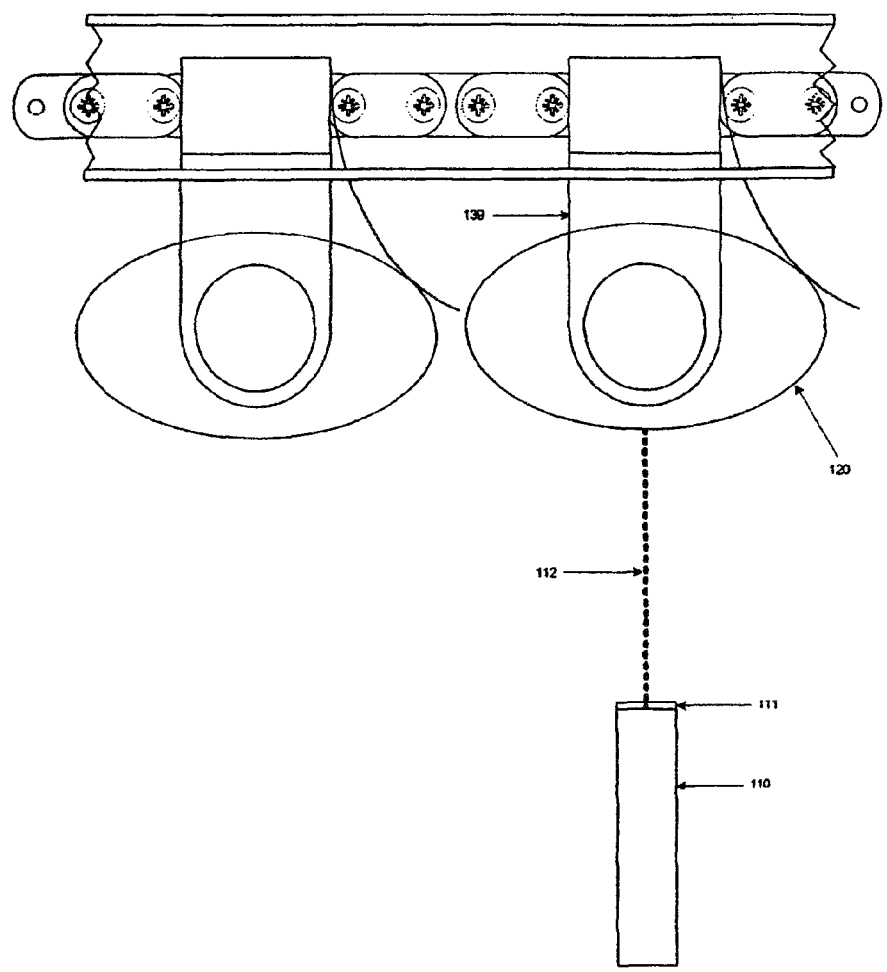
FIG. 6 is a diagrammatic view depicting apparatus embodying a portion of the present invention shown together with a portion of an egg-handling machine, for performing an embodiment of the method of the present invention.

In a method according to an embodiment of the present invention, an egg moves through a portion of an egg-grading machine as shown in FIG. 6. An egg-grading machine grades the quality of the eggs, and may also transport the eggs towards a packaging machine. Egg-grading machines will move the egg along a path. Somewhere along the path, and preferably immediately before the eggs are packed, a predetermined region can be selected where the egg will pass through and radiant energy can form markings on the egg. Typically, as shown in FIG. 6, egg-grading machines have calipers 139 that hold the eggs at some point in the path of the egg-grading machine. The radiant energy source 110 may be placed in proximity to this point when the eggs are held so that the radiant energy 112 forms the markings on an egg 120 as it passes through this predetermined region. This eliminates any need for a special apparatus to position the egg. In this way the method is performed inline with the egg-grading machine. A beam-sweeping unit 111 may control the direction of the radiant energy 112.

Figure 7:
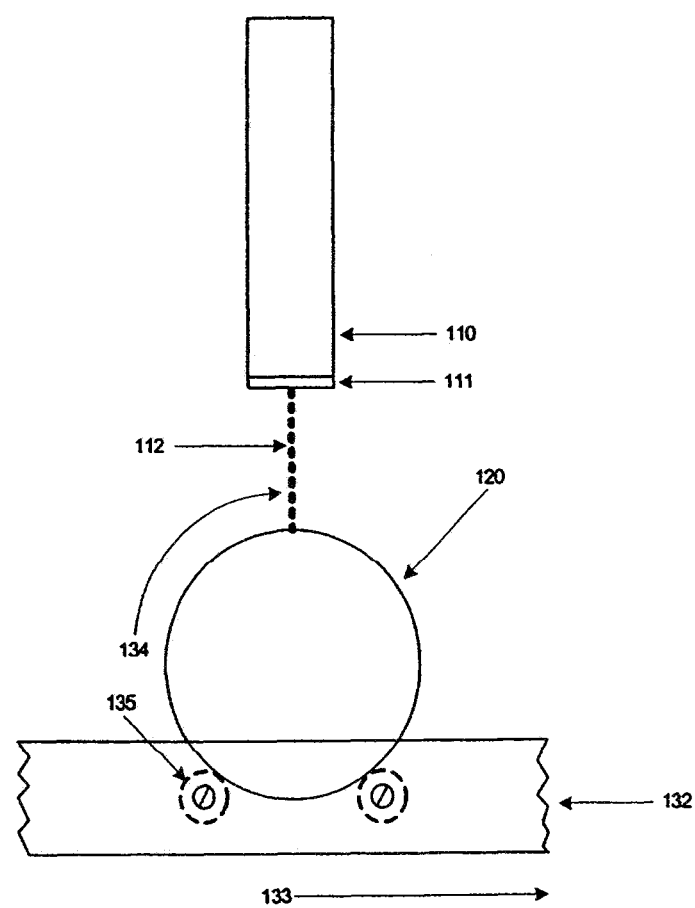
FIG. 7 is a diagrammatic view depicting apparatus useful in performing another embodiment of the method of the present invention.

In another embodiment of the present invention, a radiant energy source may be placed in proximity of an existing egg-handling machine. Egg-handling machines includes any device or apparatus that will control the movement of an egg along a path, including egg-grading machines. The radiant energy source can be placed in proximity to the egg-handling machine so that the markings may be applied to the egg inline. In FIG. 7, the egg-handling machine moves an egg 120 along a conveyor apparatus 132. Conveyor apparatus 132 may include rollers 135, or some other form of conveyance such as the calipers discussion above, that moves egg 120 in a particular direction 133. Egg 120 will move along apparatus 132 in the direction 133 apparatus 132 is moving, and egg 120 may move in a rotational direction 134 on apparatus 132. Radiant energy source 110 is placed in proximity to conveyor belt 132 such that radiant energy 112 is directed towards egg 120. Beam-sweeping unit 111 can be used to compensate for the movement 133 of conveyor belt 132 and the rotation 134 of egg 120, so that the text and graphics can be applied to the egg 120.

Figure 8:
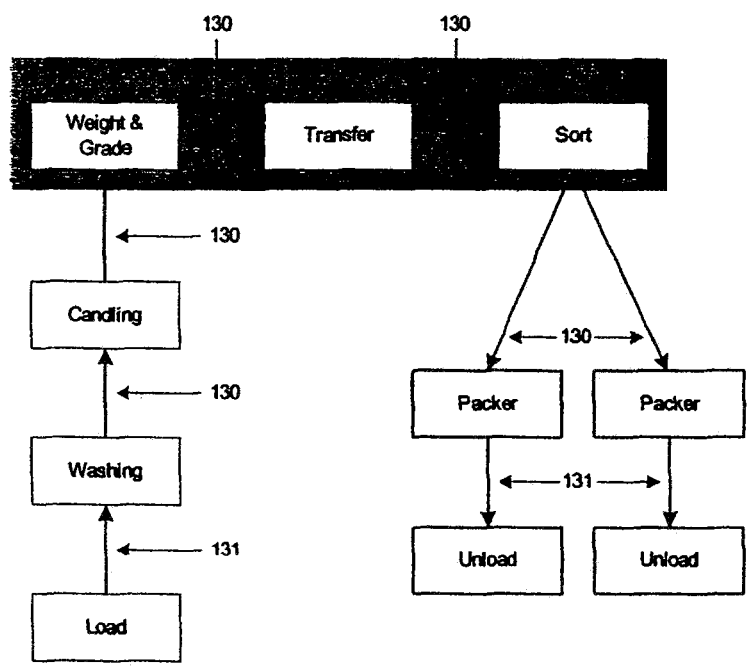
FIG. 8 is a block diagram depicting portions of an egg-handling machine and particularly illustrating inline and offline operations.

There are many variations of egg-handling machines. Most perform some common minimal basic functions. FIG. 8 is a block diagram outlining the basic functions of those machines. The eggs move through these machines while these basic functions are performed, and a radiant energy source can be placed inline 130 or offline 131 in between many of these functions to perform a method of the present invention. The eggs are loaded into the machine. An offline procedure may be performed after this function. The eggs are then washed, after which an inline method may be performed. The eggs are candled, after which an inline method may be performed. The eggs move to the grading portion of the machine where they are weighted and graded, after which an inline method may be performed. The eggs are then transferred to a sorter, before which an inline method may be performed. The eggs are then sorted by grades, after which an inline method may be performed. The eggs are placed into a package, after which an inline method may be performed. An offline process 131 can be performed prior to the load processor after the unload process and, typically involves human intervention or some other form of mechanical intervention alien to the egg-handling machine. In preferred embodiments of the present invention, the radiant energy source can be associated with an existing egg-handling machine without appreciably modifying the machine.

The radiant energy source may be connected to an input that can control the text and graphics. In one embodiment of the invention, the input is a computer. The computer can be used to enter the design of the advertisement, consisting of a tag line, a logo, and the freshness date, to be applied to the egg. The design of the tag line, logo, and freshness date can be entered into the computer in many ways, including scanning an image into the computer, or using software to make the design. The computer may be connected to the computer control system of the egg-handling machine and can import much of the data that is contained in the table of FIG. 11, and can calculate the key egg dates from the process date imported from the egg-handling machine. This data is then stored in the database together with the traceability code that can be generated by conventional indexing software located on the computer or elsewhere. The computer then controls the radiant energy source or the beam-sweeping unit to apply the marking to the egg.

Figure 9:
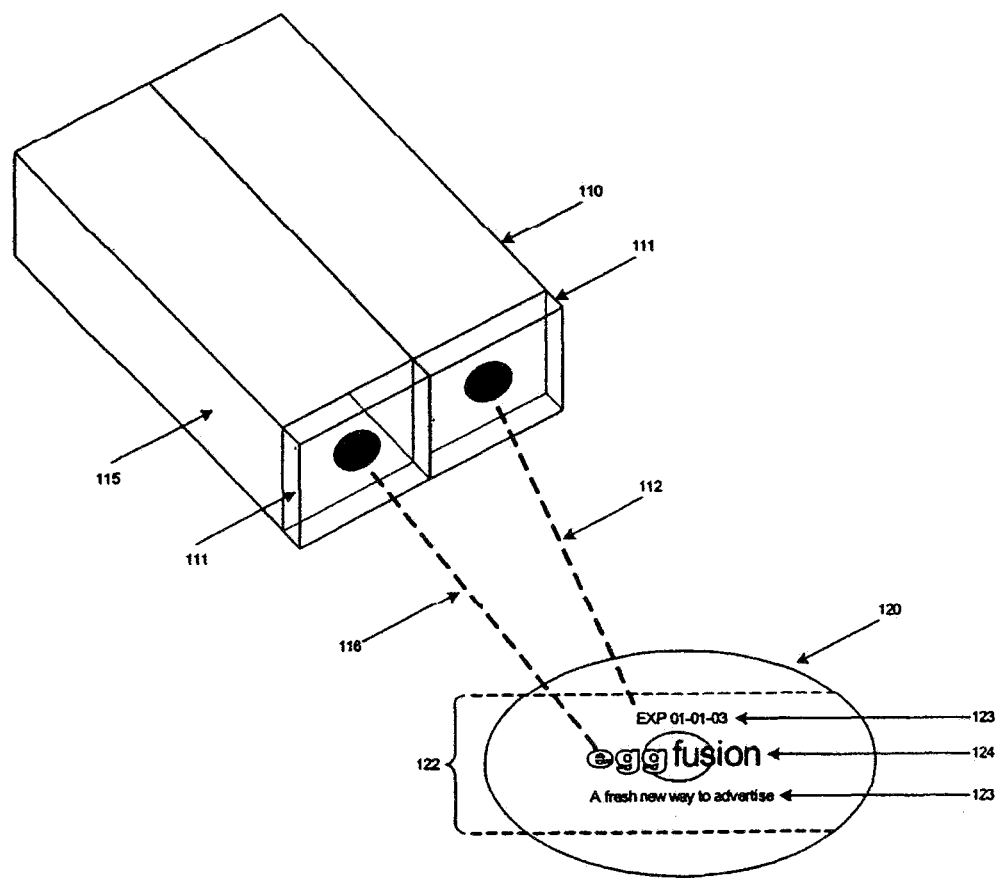
FIG. 9 is a diagrammatic view depicting apparatus for performing another embodiment of a method of the present invention.

In FIG. 9, a method is shown where the markings are formed by a raster pattern. A radiant energy source 110 can apply radiant energy 112 such that one ray of the radiant energy is responsible for marking along one horizontal of the egg to form text 123, and another radiant energy source 115 provides radiant energy 116 that is responsible for the marking of graphics 124. This also can be done with one radiant energy source that emits multiple rays of radiant energy, or with any plurality of radiant energy sources that emit radiant energy. Because of the high speed of many egg-handling machines, and therefore the small window of time during which the marking must occur, several sources may be required to provide all of the markings without decreasing the operating speed of the egg-handling machines.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A method for providing historical information regarding an egg, the method comprising:
   receiving a request to access information relating to an egg, the request including a traceability code associated with the egg, wherein the traceability code is a marking that has been generated and applied to an eggshell of the egg with a radiant energy source that is located along a path of an egg-handling machine,
   wherein the traceability code is generated by a computer control system of the egg-handling machine;
   retrieving, from at least one database, via the traceability code, the historical information regarding the egg, the historical information including information indicative of one or more operating conditions of at least one processing station of the egg-handling machine during processing of the egg, a date at which the egg was processed, and information regarding a packing lane in which the egg was processed; and
   transmitting the historical information regarding the egg to be displayed to a user.

2. The method of claim 1, further including providing a web site configured to receive requests to access information relating to eggs, wherein the act of receiving the request includes receiving the request via the web site.

3. The method of claim 2, wherein applying a marking to the eggshell includes using one or more laser beams to form the making on the eggshell.

4. The method of claim 1, further including
   monitoring the one or more operating conditions of the at least one processing station during the processing of the egg, and
   recording the information indicative of the one or more operating conditions in the at least one database.

5. The method of claim 1, wherein the historical information regarding the egg includes a temperature under which the egg was washed at the at least one processing station.

6. The method of claim 5, further including
   monitoring the temperature under which the egg was washed at the at least one processing station, and recording the temperature under which the egg was washed in the at least one database.

7. The method of claim 1, wherein the historical information regarding the egg further includes an identification of a customer who purchased the egg.

8. The method of claim 1, wherein the historical information regarding the egg further includes an identification of a customer who purchased the egg.

9. The method of claim 1, wherein the historical information regarding the egg further includes an identification of at least one advertising indicia formed on the egg.

10. The method of claim 1, wherein the historical information further includes information regarding a producer that produced the egg.

11. A system for providing historical information regarding an egg, the system comprising:
- at least one interface configured to receive a request to access information relating to at least one edible object, the request including a traceability code associated with the at least one edible object, the at least one edible object being an egg, wherein the traceability code is a marking that has been generated and applied to an eggshell of the egg with a radiant energy source that is located along a path of an egg-handling machine, wherein the traceability code is generated by a computer control system of the egg-handling machine; and
- at least one processor configured to retrieve, from at least one database, via the traceability code, historical information regarding the at least one edible object, the historical information including information indicative of one or more operating conditions of at least one processing station, of the egg-handling machine, during the processing of the egg, a date at which the egg was processed, and information regarding a packing lane in which the egg was processed, wherein the at least one interface is further configured to transmit the historical information regarding the at least on edible object to be displayed to a user.

12. The system of claim 11, wherein the at least one interface is configured to receive web requests, and wherein the request to access information relating to the at least one edible object includes a web request.

13. The system of claim 11, wherein the historical information further includes information indicative of one or more operating conditions of at least one processing station during processing of the at least one edible object.

14. The system of claim 11, wherein the historical information further includes an identification of a customer who purchased the at least one edible object.

15. The system of claim 11, wherein the historical information further includes an identification of a retailer who sells the at least one edible object.

16. The system of claim 11, wherein the historical information further includes an identification of at least one advertising indicia formed on the at least one edible object.

17. The system of claim 11, wherein the historical information further includes information regarding producer that produced the edible object.

* * * * *